May 14, 1963
R. LINDALL
3,089,775
METHOD OF REMOVING MEAT FROM BONE
Filed Jan. 21, 1960
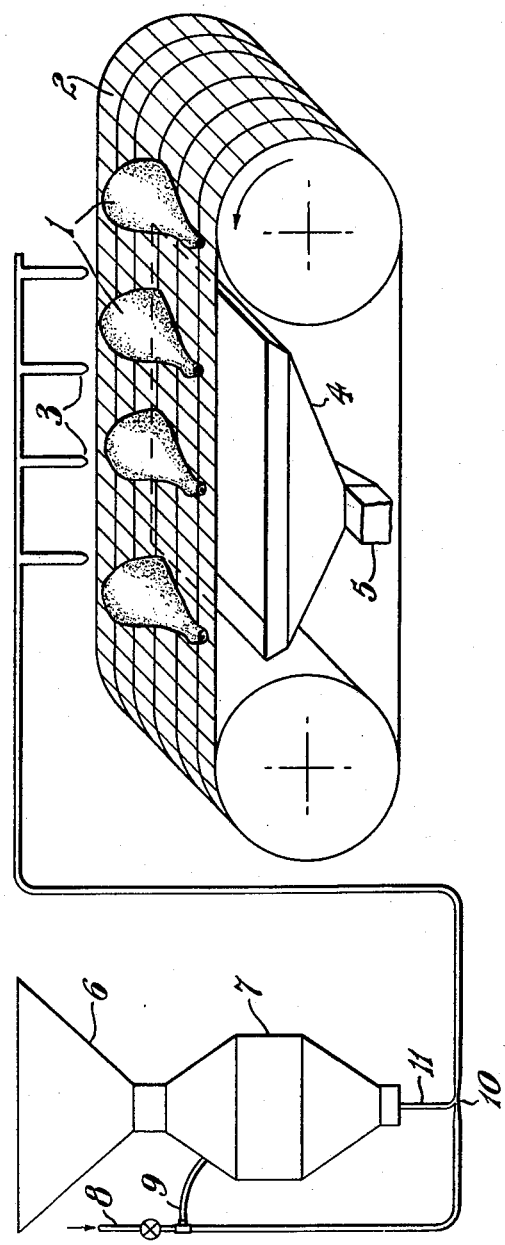
INVENTOR
REGINALD LINDALL
BY
Brumbaugh, Free, Graves & Donohue
ATTORNEYS 3,089,775
METHOD OF REMOVING MEAT FROM BONE
Reginald Lindall, Wembley, England, assignor to Unilever Limited, Chester, England, a company of Great Britain
Filed Jan. 21, 1960, Ser. No. 3,923
Claims priority, application Great Britain Jan. 23, 1959
11 Claims. (Cl. 99—107)

This invention relates to a process for removing flesh, for example, removing flesh from bone or separating flesh from flesh.

Previously, in the case of an animal carcass or part carcass, the meat flesh has been removed from the bones manually with a knife. Also, when removing or separating some meat flesh from a larger piece of meat flesh, this has been done manually with a knife.

The object of the present invention is to provide a new technique for the removal of flesh.

According to the present invention there is provided a method of removing flesh which comprises shot-blasting the flesh to be removed with solid particles, and extracting said solid particles from the removed flesh by changing the phase of said solid particles.

The solid particles are preferably ice particles, for example, particles of frozen water, or particles of solid carbon dioxide, or a mixture of these. The ice particles can be sub-cooled, that is cooled below their freezing point, to increase their abrading power.

Preferably, the solid particles are jetted at the flesh in a stream of gas, for example air. The solid particles can be carried in jets of liquid, for example water, or be projected mechanically.

The flesh can be frozen or, preferably, chilled before it is shot-blasted in order to increase its rigidity.

An example of the method according to the present invention will now be described in greater detail with reference to the accompanying drawing which is a schematic representation of an apparatus for carrying out this example.

Chilled pieces of meat containing bone, for example legs of pork 1, at a temperature of about —2° C. are conveyed by a steel mesh conveyer 2 past a battery of fixed nozzles 3, only four of which are shown in the drawing. The nozzles are arranged above and on each side of the pieces 1 and so that the ends of the nozzles are in close proximity to the surfaces of the pieces 1 as these pieces move past the nozzles. Small sub-cooled ice particles are jetted from the nozzles at the pieces 1 in streams of compressed air at a pressure of about 5 kilograms per square centimetre. The ice particles have a diameter of approximately 2 millimetres, the nozzles having a diameter of approximately 5 millimetres. The ice particles impinge at high speed upon the flesh and tear it off in small shreds until only the bones are left, these bones being carried away by the conveyer. The mixture of ice particles and shredded meat passes through the mesh of the conveyer into a hopper 4 from which the mixture discharges through a chute 5. The ice particles are extracted from this mixture by raising the temperature and draining off the resultant water. The shredded meat can then be used, for example, for sausages, meat pies, or other meat composites.

The ice particles are formed by crushing blocks of ice and then forcing the particles through a sieve to obtain the desired particle size. A mixture of frozen water particles at a temperature of —5° C. to —60° C. and solid carbon dioxide particles at —80° C. can be used. These ice particles are loaded into a hopper 6 from which they pass into a cooled chamber 7. A source of compressed air is connected to a pipe 8, a branch 9 from which supplies some compressed air to the chamber 7. The bulk of the compressed air passes through pipe 8 to a venturi 10. A pipe 11 connects the bottom of the chamber 7 to the throat of the venturi. As the compressed air passes through the venturi it draws ice particles from the chamber 7 through the pipe 11, these ice particles being carried by the compressed air to the nozzles 3.

This process can be varied depending upon the nature of the object from which the flesh is being removed or separated and the use to be made of the removed flesh.

For example, the temperature of the mixture of shredded flesh and ice particles can be controlled so that some ice particles remain in the final mixture, particularly in the case of meat, this being advantageous for further processing and also if the mixture is to be kept for some time before further use.

Although the process has been particularly described with reference to legs of pork, it is also applicable to any carcass or joint of meat. Fish and poultry may also be similarly processed, although in the case of fish a very thorough sieving stage may be necessary to remove the very small bones. In each case the form of the jets, the angles at which the jets impinge upon the object, the pressure of the jets, the size of the ice particles, and the time of jetting is chosen depending upon the relative softness and hardness of the portions it is desired to remove and leave behind respectively. Whilst the invention is particularly suitable for removing flesh from bone, it can also be used for shredding flesh containing no bone so that all the flesh is progressively removed from a piece of flesh, finally leaving nothing behind. Also, the jets can be used for cutting a piece of flesh into two, that is for removing a portion of flesh intact.

Also, the nozzles can be arranged to continuously vary the direction of their jets to play over predetermined areas in order to cover the surface of the objects more uniformly.

What is claimed is:

1. A method of removing flesh comprising the steps of shot blasting the flesh to be removed with solid frozen particles of the class consisting of ice particles and solid carbon dioxide particles and extracting the solid particles from the removed flesh by changing their phase.

2. A method of removing meat from bone comprising the steps of shot blasting the meat with solid frozen particles of the class consisting of ice particles and solid carbon dioxide particles and extracting the solid particles from the removed meat by changing their phase.

3. A method of removing flesh comprising the steps of shot blasting the flesh to be removed with ice particles and extracting at least some of the ice particles from the removed flesh by changing their phase.

4. A method as claimed in claim 3 in which the ice particles comprise particles of the solid carbon dioxide and particles of frozen water.

5. A method of removing flesh comprising the steps of shot blasting the flesh to be removed with sub-cooled ice particles and extracting ice particles from the removed flesh by changing their phase.

6. A method of removing flesh from bone comprising the steps of shot blasting the flesh while in a chilled state with solid carbon dioxide particles and extracting the solid particles from the removed flesh by changing their phase.

7. A method of removing flesh comprising the steps of jetting ice particles in a stream of fluid at the flesh to be removed, and extracting the solid particles from the removed flesh by changing their phase.

8. A method as claimed in claim 7 in which the fluid is air.

9. A method of removing meat from bone comprising the steps of chilling the meat, shot blasting the meat with ice particles, and extracting ice particles from the removed meat by changing the phase of these ice particles.

10. A method of removing meat from bone comprising the steps of freezing the meat, shot blasting the meat with sub-cooled frozen liquid particles, and extracting the frozen particles from the removed meat by changing the phase of these frozen particles.

11. A method of removing meat from bone comprising the steps of shot blasting the meat with a mixture comprising solid carbon dioxide particles and frozen water particles, and extracting the solid shot from the removed flesh by changing the phase of the shot.

References Cited in the file of this patent

UNITED STATES PATENTS

| | | |
|---|---|---|
| 2,418,914 | Tichy | Apr. 15, 1947 |
| 2,784,446 | Beatty | Mar. 12, 1957 |
| 2,851,362 | Goldberg | Sept. 9, 1958 |
| 2,858,222 | Harris et al. | Oct. 28, 1958 |